United States Patent [19]
Yamaji et al.

[11] Patent Number: 5,295,662
[45] Date of Patent: Mar. 22, 1994

[54] FLUID FLOW-CONTROLLER WITH IMPROVED DIAPHRAGM

[75] Inventors: Michio Yamaji; Kenji Yamamoto, both of Osaka, Japan

[73] Assignee: Masako Kiyohara, Kumamoto, Japan

[21] Appl. No.: 35,209

[22] Filed: Mar. 22, 1993

Related U.S. Application Data

[63] Continuation-in-part of Ser. No. 928,029, Aug. 11, 1992, abandoned.

[30] Foreign Application Priority Data

Aug. 26, 1991 [JP] Japan .................. 3-240346

[51] Int. Cl.5 .................. F16K 7/16; F16K 31/50
[52] U.S. Cl. .................. 251/331; 92/103 M; 251/274; 251/276; 251/335.2
[58] Field of Search .................. 251/61.1, 331, 335.2, 251/264, 274, 275, 276, 277, 278; 92/103 M

[56] References Cited

U.S. PATENT DOCUMENTS

| | | | |
|---|---|---|---|
| 1,573,304 | 2/1926 | Darling | 251/335.2 |
| 1,844,528 | 2/1932 | Smith | 251/331 |
| 3,250,511 | 7/1963 | Priese | 251/331 |
| 3,628,770 | 12/1971 | Rost | 251/331 |
| 3,874,636 | 4/1975 | Bake et al. | 251/335.2 |
| 3,982,729 | 9/1976 | Tricini | 251/335.2 |
| 4,014,514 | 3/1977 | Priese et al. | 251/331 |
| 4,171,792 | 10/1979 | Bass | 92/98 |
| 4,421,294 | 12/1983 | Parkison et al. | 251/86 |
| 4,606,374 | 8/1986 | Kolenc et al. | 137/556.3 |
| 4,760,990 | 8/1988 | Kerger et al. | 251/335.2 |
| 4,867,201 | 9/1989 | Carter | 251/331 |
| 4,928,919 | 5/1990 | Daicho et al. | 251/89 |
| 5,108,069 | 4/1992 | Tada et al. | 251/331 |
| 5,178,366 | 1/1993 | Kojima et al. | 251/335.2 |

FOREIGN PATENT DOCUMENTS

| | | | |
|---|---|---|---|
| 237981 | 1/1965 | Australia | 251/331 |
| 2607018 | 9/1976 | Fed. Rep. of Germany | 251/335.2 |
| 244976 | 10/1986 | Japan . | |
| 12461 | 4/1905 | United Kingdom . | |

*Primary Examiner*—George L. Walton
*Attorney, Agent, or Firm*—Griffin Butler Whisenhunt & Kurtossy

[57] ABSTRACT

A diaphragm type fluid flow controller comprises a valve body having formed therein an inlet and an outlet passage, the passages communicating with a valve chamber formed in the valve body. The valve chamber is sealed by a flexible diaphragm. A threaded valve stem is rotated by a handle to cause pressure to be applied to the diaphragm to selectively open or close the valve. A stop ring limits movement of the valve stem in the direction of the diaphragm so that the pressure applied to the diaphragm is limited once the valve is closed. The diaphragm comprises a plurality of nested thin metal dome-shaped plates having upturned peripheral edges which are clamped between the stop ring and a rim formed on the valve body at the upper extent of the valve chamber. The plural plates insure air-tightness of the valve chamber because any rotation of the stop ring, resulting from tightening the valve after closure, is not transmitted to the lower-most diaphragm plate. The upturned edges make individual diaphragm plates easier to handle. In addition, plural nested plates may be assembled and inserted into a valve as a unit. The upturned edges of the plates make it easier to grip and remove the plates from a valve in instances where it is desirable to leave the valve in-line during the removal process.

10 Claims, 7 Drawing Sheets

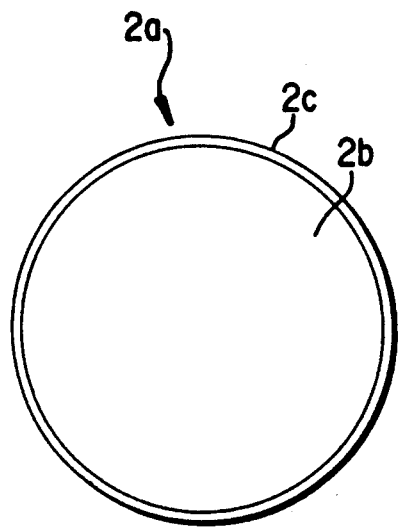
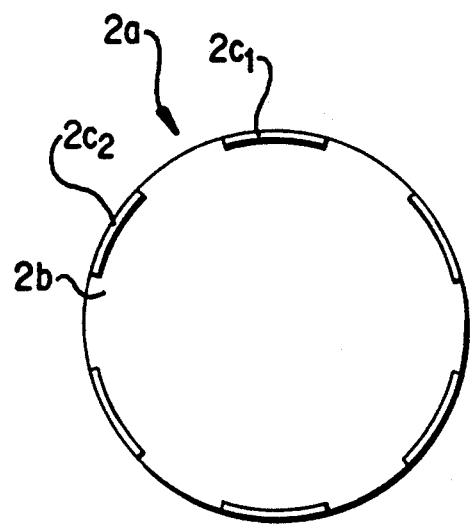
FIG. 6A  FIG. 5A
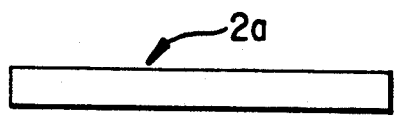
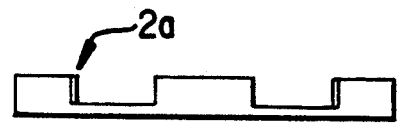
FIG. 6B  FIG. 5B
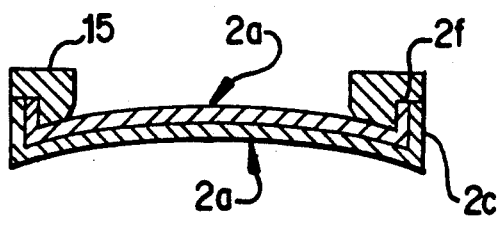
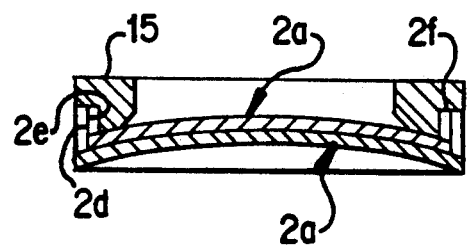
FIG. 6C  FIG. 5C

FLUID FLOW-CONTROLLER WITH IMPROVED DIAPHRAGM

RELATED APPLICATIONS

This application is a continuation-in-part of application Ser. No. 07/928,029 filed Aug. 11, 1992 now abandoned.

FIELD OF THE INVENTION

The present invention relates to fluid flow-controllers or valves and more particularly to diaphragm type valves for controlling the flow of fluid through pipe lines. The invention is admirably suited for use in valves for controlling fluid flow in nuclear power plants and apparatus for producing semiconductors where high purity gases are being transported and leakage must be avoided.

BACKGROUND OF THE INVENTION

In a typical diaphragm valve of the prior art a valve body includes inlet and outlet passages communicating with a valve chamber with a seating ring surrounding the region where one of the passages connects with the chamber. A flexible diaphragm is mounted in the valve body and is selectively moved away from the seating ring to permit fluid flow through the valve or pressed against the seating ring to block fluid flow. A handle is rotated to move a threaded valve stem which engages a threaded valve bonnet so that longitudinal movement of the valve stem forces the diaphragm to seat against the valve seating ring.

If, after the diaphragm has seated against the seating ring, the handle is rotated to move the valve stem further in the direction of the diaphragm, an excessive force may be exerted against the diaphragm causing it to rupture or fail. Using a thicker diaphragm will not solve the problem because a thick diaphragm is less flexible than a thin one and, because it is less flexible it has a greater tendency to crack as a result of the force repeatedly exerted against it.

In some valves of the prior art, the problem of diaphragm failure by rupture or cracking is overcome by providing a stop ring for limiting movement of the valve stem in the direction of the diaphragm. However, if the stop ring also serves as a clamp for holding the peripheral edge of the diaphragm, a further problem is introduced. After the diaphragm has seated against the seating ring further rotation of the handle causes a rotational force to be exerted via the stem and the stop ring to the diaphragm causing a rotational movement of the diaphragm with an attendant loss of air-tightness of the valve chamber. The prior art solves this problem by employing a diaphragm comprising a plurality of generally flat thin plates which may slide relative to each other so that rotational movement of the stop ring is not transmitted to the plate which seals the valve chamber.

It is difficult to handle the flat thin plates and during assembly they are frequently dropped and/or damaged. They cannot be assembled as a unit hence they must be placed in a valve one plate at a time. Furthermore, it is difficult to remove the flat plates from a valve, particularly in instances where it is desirable or necessary that the valve be repaired without removing it from the pipe or conduit in which it is installed.

SUMMARY OF THE INVENTION

An object of the present invention is to provide a diaphragm for a valve, the diaphragm comprising a plurality of nested cup-shaped elements having upturned peripheral edges.

Another object of the present invention is to provide a diaphragm for a valve, the diaphragm comprising a plurality of circular elements having upturned peripheral edges, the elements having different diameters.

Yet another object of the invention is to provide a diaphragm as described above wherein the diaphragm elements are force-fitted one within another so that they may be assembled and handled as a unit.

Another object of the invention is to provide a diaphragm valve with a stop ring for limiting the closing force applied to the diaphragm, the stop ring serving to clamp the diaphragm in place and the diaphragm comprising a plurality of nested elements having upturned peripheral edges.

Other objects and advantages of the invention and its mode of implementation will become apparent upon consideration of the following description and the accompanying drawings.

BRIEF DESCRIPTION OF THE DRAWINGS

FIG. 5A is a plan view of a first embodiment of a nestable diaphragm disc;

FIG. 5B is an elevational view of the disc shown in FIG. 5A;

FIG. 5C is a sectional view taken across the diameter of a diaphragm comprising two nested discs of the type shown in FIG. 5A;

FIG. 6A is a plan view of a second embodiment of a nestable diaphragm disc;

FIG. 6B is an elevational view of the disc shown in FIG. 6A;

FIG. 6C is a sectional view taken across the diameter of a diaphragm comprising two nested discs of the type shown in FIG. 6A;

DESCRIPTION OF THE INVENTION

Figure 7:
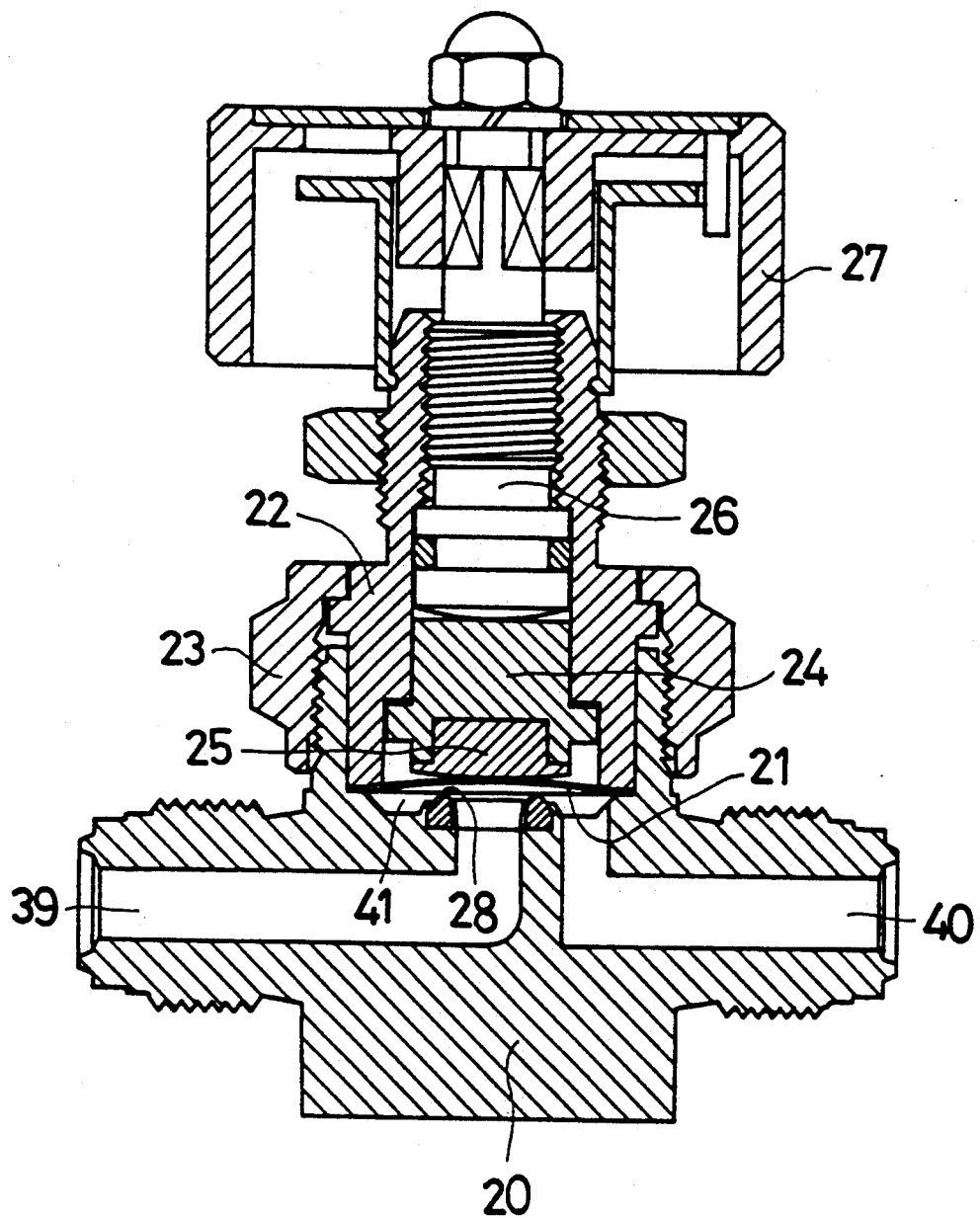
FIG. 7 is a sectional view of a valve of the prior art.

FIG. 7 illustrates a prior art valve or fluid-controller comprising a valve body 20, a diaphragm 21, a cover or bonnet 22, a bonnet nut 23, a disc 24, a diaphragm presser 25, a stem 26 and a handle 27. The body 20 is provided with fluid inlet and outlet passages or ports 39, 40 which connect with a recessed valve chamber 41. One of the fluid passages connects with the center of valve chamber 41 through a valve seat 28. A thin diaphragm 21 is provided for closing the passage 39 by pressing against the seating ring 28.

The bonnet 22 is pressed downwardly by internally threaded bonnet nut 23 as the bonnet nut is screwed downwardly on an externally threaded upper portion of the valve body thereby clamping the periphery of the diaphragm 21. The diaphragm presser 25 is mounted as an insert on the bottom of disc 24. The disc 24 and diaphragm presser 25 are mounted for vertical sliding movement within bonnet 22.

Valve stem 26 has an externally threaded portion which engages internal threads on the upper portion of bonnet 22. A handle 27 is attached to the top of the valve stem 26 for rotating the stem to thereby raise or lower it.

FIG. 7 illustrates the valve in the opened condition wherein fluid may flow between the fluid passages 39, 40 through the valve chamber 41. To close the valve and stop fluid flow, the handle 27 is rotated to lower valve stem 26. The bottom of the valve stem presses downwardly on the disc 24. The disc 24 and diaphragm presser 25 move downwardly and flex diaphragm 21 until it seals against the upper surface of valve seat 28 thus stopping flow between passages 39, 40.

To again fully open the valve and permit fluid flow between the fluid passages 39, 40, the handle 27 is rotated so as to raise the valve stem 26. Upward pressure of the resilient diaphragm 21 against the bottom of the diaphragm presser 25 causes the disc 24 and diaphragm presser 25 to slide upwardly until the diaphragm 21 has returned to the position shown. As the diaphragm 21 begins its upward movement, the seal between the diaphragm and valve seat 28 is broken thus permitting fluid flow between passages 39, 40.

The valve of FIG. 7 has a disadvantage in that the life of the diaphragm 21 is limited. The handle 27 may be turned to move the valve stem 26 downwardly even after the diaphragm 21 has been depressed sufficiently to seal against the seating ring 28. This results in wear or rupture of the diaphragm. The diaphragm may be made of metal but if it is made thin in order to gain the desired flexibility it is not durable. On the other hand, if the diaphragm is relatively thick it is less flexible and thus it tends to crack. Since the diaphragm serves as a seal for the valve chamber 21, any rupture or cracking of the diaphragm permits leakage from the valve of the gaseous or liquid fluid being transported through the valve.

One solution to the problem of diaphragm rupture and cracking is to provide a diaphragm comprising a plurality of generally flat or slightly dished discs stacked one on the other and clamped about a peripheral edge as shown, for example, in U.S. Pat. Nos. 4,171,792 and 4,760,990. While this reduces the likelihood of leakage due to rupture and cracking, the plural discs are difficult to handle during valve assembly. In U.S. Pat. No. 4,171,792 the discs are prepacked in a retainer to solve this problem.

Figure 1:
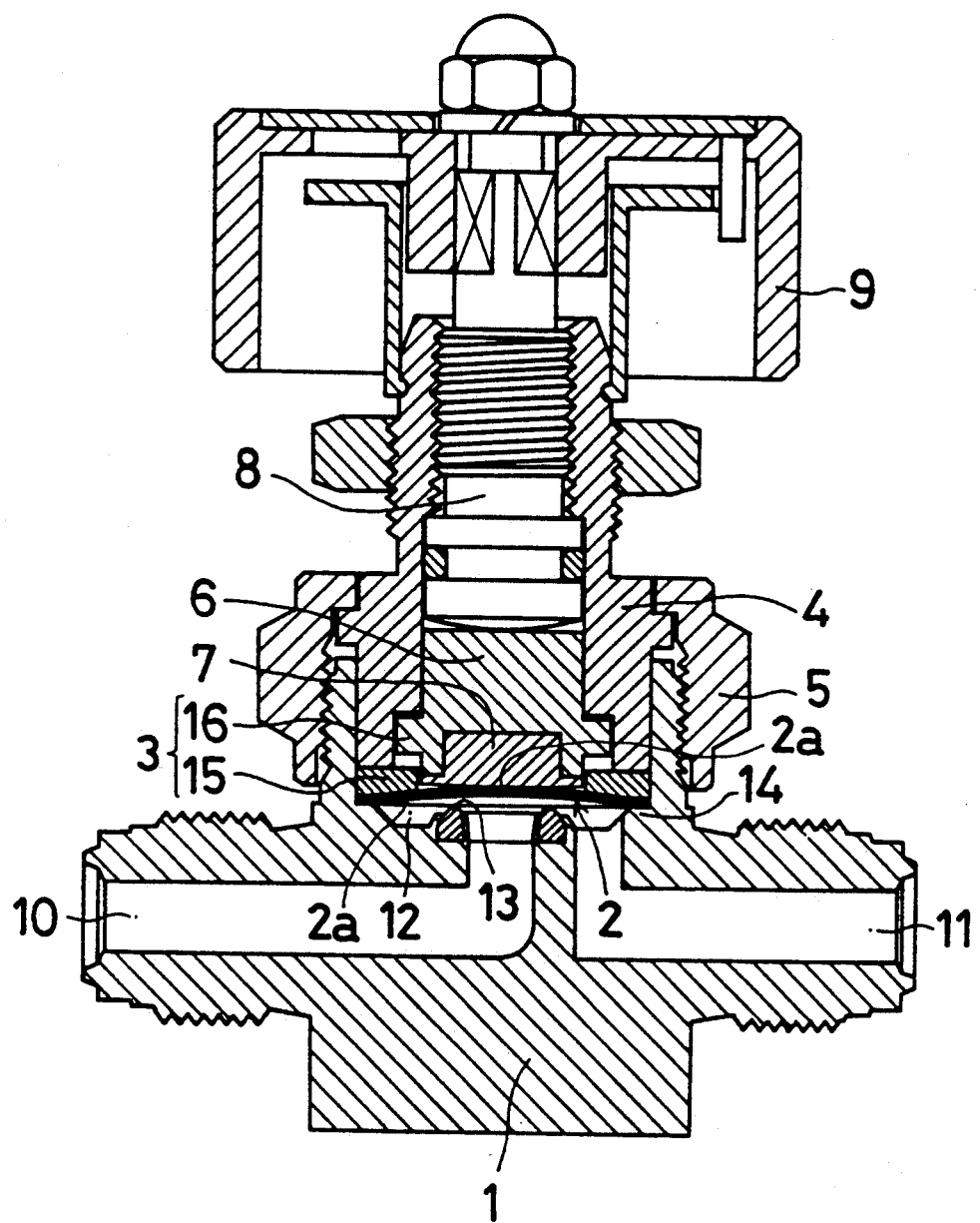
FIG. 1 is a sectional view of a valve constructed in accordance with the present invention, the valve being shown with the diaphragm in an open position permitting fluid flow through the valve.
Figure 2:
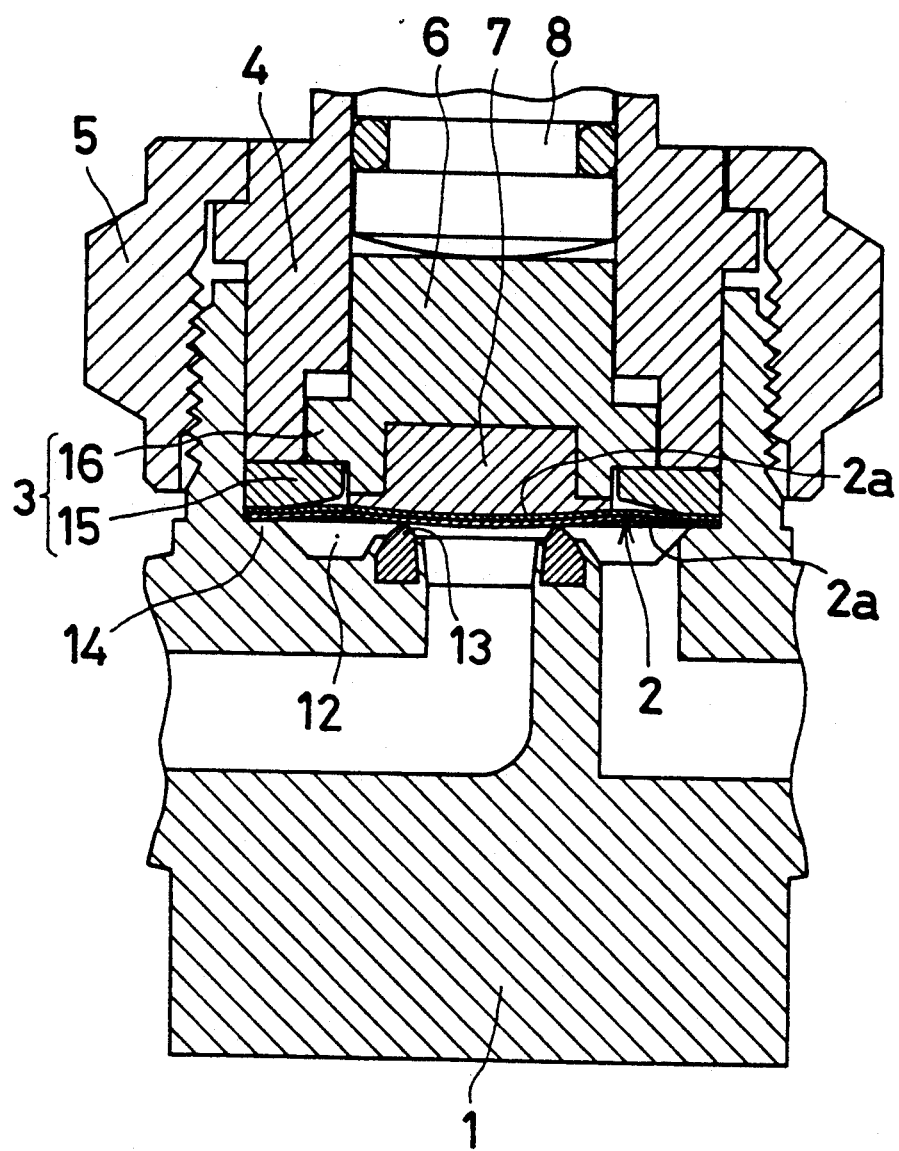
FIG. 2 is an enlarged sectional view of a portion of the valve illustrated in FIG. 1, the diaphragm being shown in a closed position blocking the flow of fluid through the valve.

To overcome the above-mentioned problems, a valve such as that shown in FIG. 7 may be modified as illustrated in FIGS. 1 and 2. In the latter figures the valve includes a valve body 1 of stainless steel having formed therein fluid inlet and outlet passages 10, 11 connecting with a recessed valve chamber 12, a seating ring 13 of synthetic resin, a diaphragm 2, a valve bonnet 4, a bonnet nut 5, a disc 6 of stainless steel (SUS 630), a diaphragm presser 7 of synthetic resin, a valve stem 8 and a handle 9, all of which are arranged substantially as described with reference to FIG. 7.

In addition, the valve of FIGS. 1 and 2 is provided with a stop mechanism 3 comprising a stop ring 15 of stainless steel (SUS 316) and an annular step or rim 16 integrally formed with the disc 6 and extending outwardly around the periphery of the disc. When the bonnet nut 5 is tightened down on bonnet 4, the downwardly extending periphery of the bonnet presses downwardly on the top surface of stop ring 15 and the stop ring in turn presses the outer edge of diaphragm 2 against an annular step 14 of the valve body. The lower surface of stop ring 15 curves upwardly toward its interior diameter thus permitting the diaphragm 2 freedom to flex. The rim 16 is located on the disc 6 at a vertical position such that when the diaphragm presser 7 is lowered sufficiently to seal the diaphragm 2 against the seating ring 13, the rim engages the upper surface of stop ring 15.

The diaphragm 2 comprises a plurality of thin metal elements 2a, one of which is illustrated in FIGS. 5A and 5B. Each metal element comprises a dome-shaped disc 2b having an upturned peripheral edge 2c extending generally perpendicular to the plane of the disc. The elements 2a may be thin sheets of stainless steel such as ICONEL TM or they may comprise thin sheets of a metal alloy having memory. The elements 2a are nested one within another as shown in FIG. 5C. To facilitate nesting and to permit the handling of nested elements as a unit, the diameters of the peripheral edges 2c are different so that a frictional fit exists between the outer surface 2d of one element and the inner surface 2e of the element in which the one element is nested. The heights of the upturned peripheral edges 2c are different so that when the elements are stacked the upper surfaces form a flat surface 2f against which the stop ring 15 may act.

After the elements are nested as shown in FIG. 5C, the assembled stack is positioned on the step 14 with the domes extending upwardly so that a space exists between the bottom-most element and the seating ring 13 when the diaphragm presser is not pressing against the top-most element.

If the valve is open as shown in FIG. 1, fluids may flow between passages 10 and 11 through valve chamber 12. To close the valve and stop the fluid flow, the handle 9 is rotated to lower stem 8 and the stem in turn forces the disc 6 and diaphragm presser 7 downwardly so as to press diaphragm 2 downwardly toward seating ring 13. When the diaphragm has been pressed to the position shown in FIG. 2, it forms a seal with seating ring 13 to block the flow of fluid. At the same time, the rim 16 engages stop ring 15 so as to limit further downward movement of disc 6 and diaphragm presser 7, thereby preventing the application of a force to the diaphragm 2 which might crack or rupture it.

Should the user attempt to further "tighten" the valve by rotating handle 9, sliding friction forces between the lower surface of rim 16 and the upper surface of stop ring 15 may cause the stop ring to rotate. Similar frictional forces between the stop ring 15 and the uppermost diaphragm element 2a may also cause the uppermost element to rotate. However, because of the relatively small area of contact between the stop ring and the upper surface of the upturned portion of the lowermost element it is unlikely that the lowermost element 2a will rotate hence a tight seal is maintained between the lowermost element and the rim 14 so that no fluid may escape from chamber 12.

The diaphragm element 2a illustrated in FIGS. 5A-5C has an upturned edge 2c which is discontinuous in that it comprises a plurality of arcuate sections $2c_1$ and $2c_2$, etc. If more structural rigidity is desired, such as, for example, to resist the downward force of the stop ring 15 as the valve is closed, an upturned edge 2c may be continuous around the entire periphery of the element as illustrated in FIGS. 6A–6C.

Figure 8:
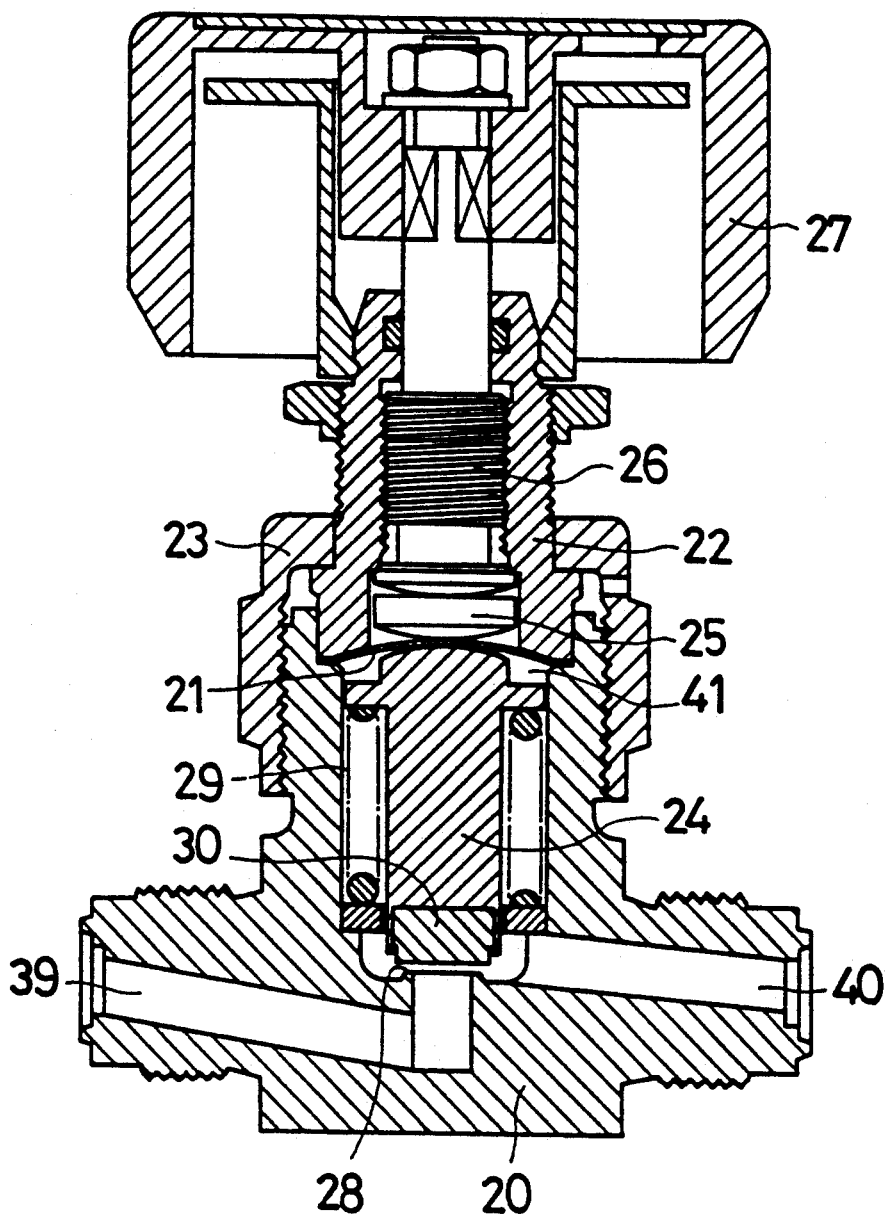
FIG. 8 is a sectional view of another valve of the prior art.

The invention is also applicable to diaphragm valves wherein the diaphragm presser is driven by the valve stem and a disc packing carried by a disc mounted inside the valve chamber cooperates with the valve seat to control the flow of fluid through the valve. FIG. 8 shows a prior art valve arranged in this manner.

In FIG. 8, as the valve is closed, the valve stem 26 moves downwardly to drive the diaphragm presser 25 toward diaphragm 21. As the diaphragm moves downwardly it forces a disc 24, located within the valve chamber 41, downwardly against the force of a compression spring 29. The bottom of disc 24 carries a packing 30 which seals against a seating ring 28 formed in the bottom of the valve chamber around the area where fluid passage 39 connects with the valve chamber thereby blocking flow of fluid through the valve.

As handle 27 is rotated to raise valve stem 26, the diaphragm 26 flexes back to its original shape thus raising the diaphragm presser 25. The compression spring 25 raises the disc 24 so that it follows the diaphragm. As disc 24 is raised, the packing 30 unseats from seating ring 28 so that fluid may again flow through the valve.

Figure 3:
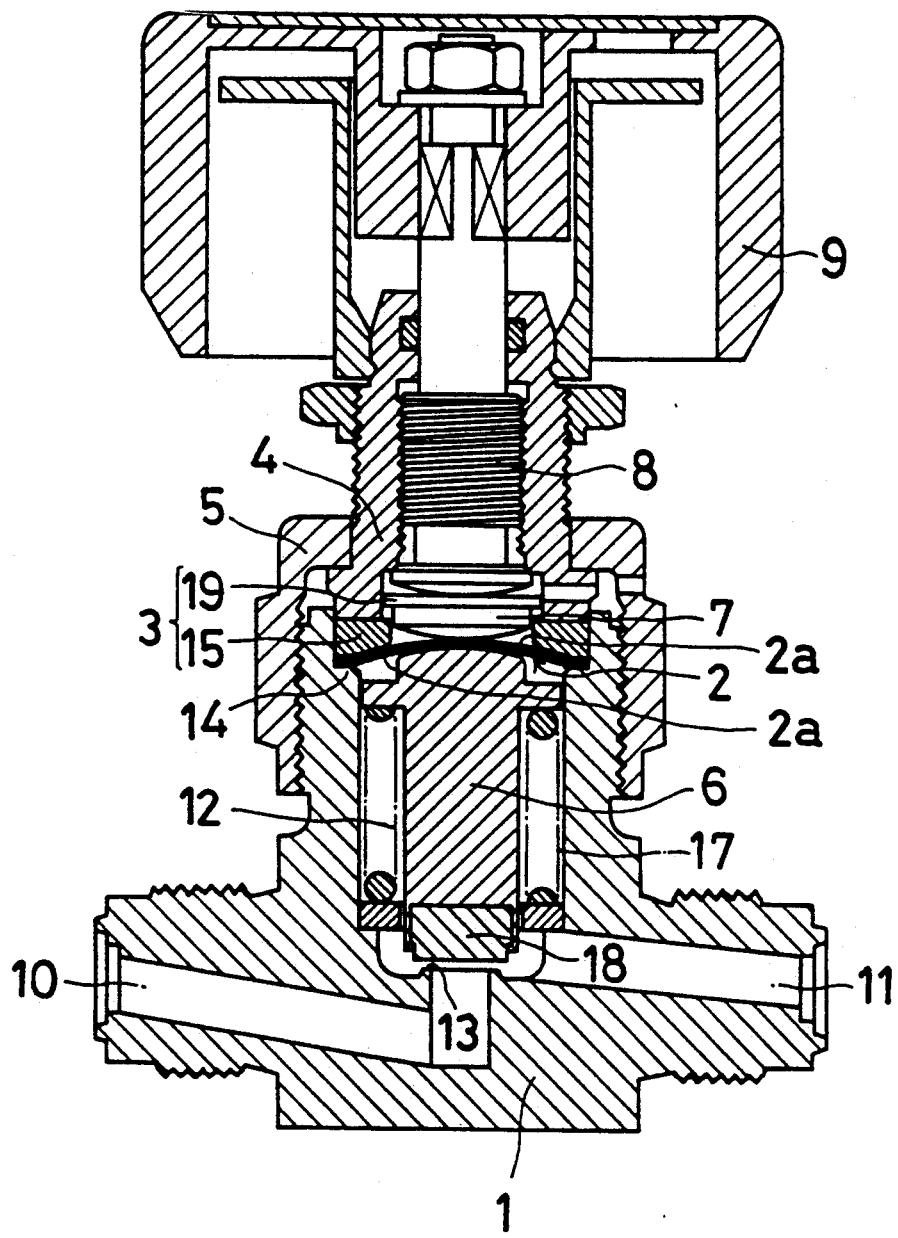
FIG. 3 is a sectional view of a second embodiment of a valve, the valve being shown in the open position permitting fluid flow.
Figure 4:
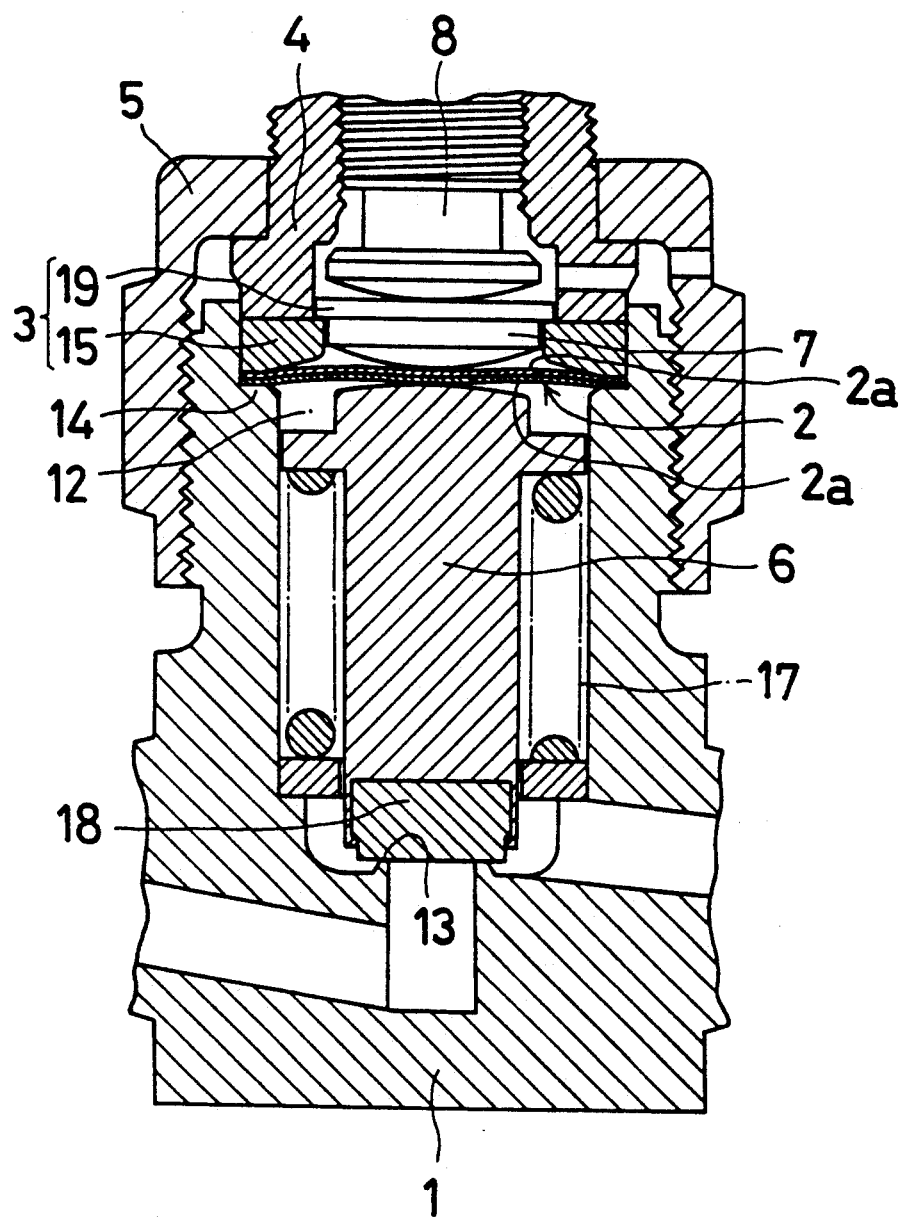
FIG. 4 is an enlarged view of a portion of the valve illustrated in FIG. 3, the valve being shown in the closed position blocking fluid flow.

In accordance with the present invention a valve of the type shown in FIG. 8 is modified as shown in FIGS. 3 and 4 to provide a stop mechanism 3 and a diaphragm comprising a plurality of nested diaphragm elements 2a. The stop mechanism comprises a stop ring 15 and a presser plate 19. As in the embodiment of FIG. 1, the stop ring is pressed downwardly by the bottom of bonnet 4 as the bonnet nut 5 is tightened and clamps the periphery of the nested diaphragm elements against a rim 14 on the valve body thus forming an air-tight seal at the top of the valve chamber 12.

The presser plate 19 is disposed between the bottom of stem and the top of diaphragm presser 7. The diameter of presser plate 19 is made large enough so that its downward movement is limited by engagement with the inner top edge of stop ring 15. The arrangement of presser plate 19 and stop ring 15 is such that the presser plate engages the stop ring as the packing 18 seals against seating ring 13 as shown in FIG. 4.

When the valve is open as shown in FIG. 3, fluid flows between fluid passages 10 and 11 through valve chamber 12. To stop or reduce the flow of fluid through the valve, handle 9 is rotated so as to move the threaded stem 8 downwardly within threaded bonnet 4. The stem 8 forces presser plate 19 and diaphragm presser 7 downwardly so as to flex diaphragm 2. As diaphragm 2 flexed downwardly it moves disc 6 and packing 18 downwardly against the force of a compression spring 17. When the packing 18 seats against seating ring 13 (FIG. 4) the flow of fluid through the valve is blocked.

As the packing 18 seals against seating ring 13, the presser plate 19 engages stop ring 15 to limit further downward movement of diaphragm presser 7 which might damage the diaphragm 2. Should the user "tighten down" the valve by further rotation of handle 9, sliding friction between the surfaces of stem 8 and presser plate 19, presser plate 19 and stop ring 15, and stop ring 15 and the upper plate element 2a of the diaphragm may cause the upper plate element 2a to rotate. However, it is unlikely that the lowermost plate 2a will rotate because of the relatively small area of contact between the stop ring and the upper surface of the upturned peripheral edge of the lowermost element. Therefore, an air-tight seal for chamber 12 is maintained between the lowermost element 2a and the rim 14.

Although the diaphragm has been shown as having two elements 2a, the diaphragm may comprise more than two elements. The more elements there are making up the diaphragm 2, the less likely the rotational movement of the stop ring 15 will be transmitted to the bottom-most element which serves as the seal for the chamber.

From the foregoing description it is seen that the present invention provides a multiple element diaphragm which is structurally more rigid than multiple-plate diaphragms of the prior art and may be preassembled for insertion as a unit into a valve with requiring a retainer to hold the elements together. Furthermore, the upturned edges make the individual diaphragm elements easier to handle and, in addition, make it easier to grip and remove the diaphragm elements from a valve should that be required.

While the invention has been described in detail as embodied in preferred embodiments, it will be understood that modifications and substitutions may be made without departing from the spirit and scope of the invention as defined by the appended claims.

We claim:

1. A valve comprising a valve body having fluid passages connecting with a valve chamber in said valve body, a diaphragm cooperating with said valve body to seal said valve chamber, means including a threaded valve stem longitudinally and rotatably movable in a valve bonnet mounted on said valve body for applying a force to said diaphragm, and stop means for limiting movement of said valve stem in the direction of said diaphragm when said valve is closed, said valve being characterized in that said diaphragm comprises a plurality of nested thin metal elements, each said element having a dome shaped circular portion and an upturned peripheral edge extending perpendicular to the circular portion, said elements being of different diameters whereby one said elements may be nested within another with an outer surface of the peripheral edge of the nested element engaging an inner surface of the peripheral edge of the element in which it is nested.

2. A valve as claimed in claim 1 wherein the means for applying a force to said diaphragm includes a disc carrying a diaphragm presser which presses against said diaphragm, said disc and presser being slidably mounted for movement in said valve bonnet, said stop means comprising a stop ring clamped with said diaphragm elements between said valve body and said valve bonnet and a rim projecting outwardly of said disc for engaging said stop ring as said valve is closed.

3. A valve as claimed in claim 2 and further comprising a valve seat surrounding a region of said valve chamber where one of said fluid passages connects with said valve chamber, said diaphragm sealing against said valve seat to block fluid flow through the valve when the valve is closed.

4. A valve as claimed in claim 3 wherein said valve body, said diaphragm elements, said disc and said stop ring comprise stainless steel.

5. A valve as claimed in claim 1 wherein the means for applying a force to said diaphragm includes a presser plate adjacent an end of the valve stem and a diaphragm presser between said presser plate and said diaphragm, said presser plate and said diaphragm presser being slidably mounted for movement in said valve bonnet, said stop means comprising a stop ring clamped with said diaphragm plates between said valve body and said valve bonnet, said presser plate engaging said stop ring as said valve is closed.

6. A valve as claimed in claim 5 and further comprising a valve seat surrounding a region of said valve chamber where one of said fluid passages connects with said valve chamber, a disc carrying a packing mounted in said valve chamber, and a compression spring biasing said disc against said diaphragm, said packing sealing against said valve seat to block fluid flow through the valve when the valve is closed.

7. A valve as claimed in claim 6 wherein said valve body, said diaphragm elements, said disc, said stop ring and said presser plate comprise stainless steel.

8. A valve as claimed in claim 1 wherein the upturned peripheral edge of each plate is of a different height so that the upturned edges of nested plates form a flat surface against which said stop means presses.

9. A valve as claimed in claim 1 wherein each of said upturned peripheral edges comprises a plurality of spaced arcuate segments.

10. A valve as claimed in claim 1 wherein the upturned peripheral edge of a given plate is of the same height about the entire periphery of said given plate.

* * * * *